Patented July 1, 1930

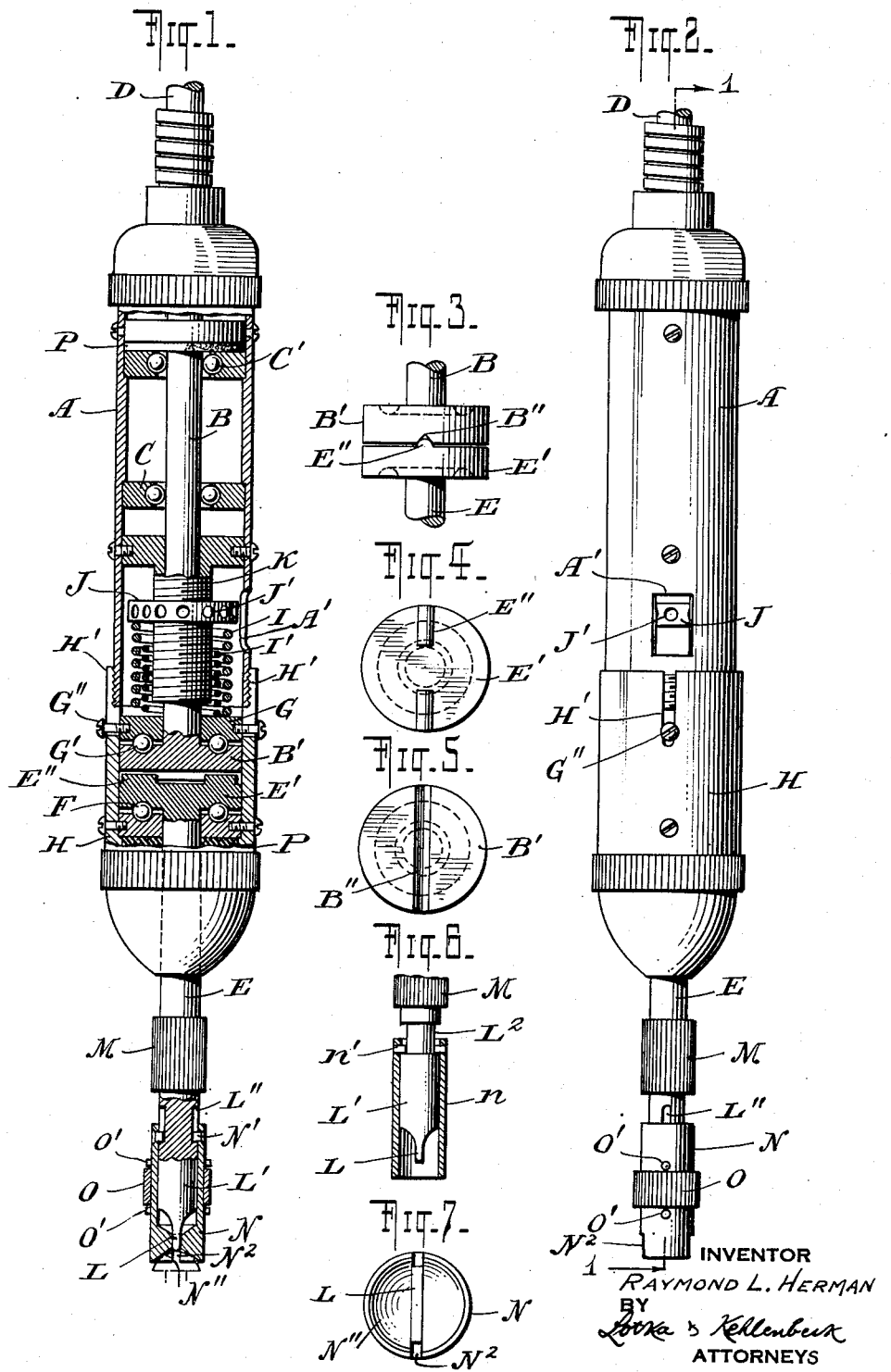

1,769,510

UNITED STATES PATENT OFFICE

RAYMOND L. HERMAN, OF NEW YORK, N. Y.

SCREW DRIVER AND OTHER TOOL

Application filed December 20, 1929. Serial No. 415,432.

My invention relates to screw drivers and other tools which rotate during their operation, and particularly to tools of this type which are driven by power, leaving the operator free to use both of his hands in holding and guiding the tool. As hitherto constructed, such tools have depended for their efficiency and the character of their work, on the pressure exerted by the operator, with the result that uniform work was practically impossible. One of the features of my present invention renders the tool entirely independent of the pressure exerted by the operator, the pressure which applies the tool being furnished by an elastic device operating automatically and insuring uniform results. Another feature of the invention relates to a mechanism which disconnects the tool from its drive automatically as soon as the work or operation has been completed. Still another feature of the invention provides means for readily centering the tool relatively to its work, and in its preferred form this centering means also forms a guard to protect the operator against accidental contact with the tool, and a handle or grip by which he may guide the tool more conveniently. Other features of the invention will be pointed out hereinafter.

Two satisfactory and preferred forms of my invention is shown in the accompanying drawings, in which Fig. 1 is substantially a longitudinal section on line 1—1 of Fig. 2; Fig. 2 is a side elevation of the tool; Fig. 3 is a detail elevation of a clutch forming part of the device; Figs. 4 and 5 are face views of the adjacent faces of the two clutch members; Fig. 6 is a partial longitudinal section of a modification and Fig. 7 an end view of the tool arrangement shown in Fig. 1.

The embodiments of my invention illustrated comprise a casing A containing a shaft B journaled in suitable bearings C, C' and receiving power in any suitable manner, preferably from a flexible shaft D. The power shaft or driving shaft B has a clutch connection with the driven shaft E, said shafts B, E being in axial alignment. The shaft B has a clutch member B' rigid therewith, or at least compelled to rotate with it. Similarly, the shaft E has a clutch member E' held to rotate in unison therewith. The face of the disk or member E' distant from the clutch member B' engages a thrust bearing F. The face of the disk E' adjacent to the companion clutch member B' has a plurality of radial ribs or projections E'', preferably rounded (semi-circular in cross section, as shown). The corresponding face of the driving clutch member B' has a diametral groove or recess B'' to receive said ribs E'', but this groove is triangular or wedge-shaped in cross section, to facilitate disengagement of the clutch members from each other. The driving clutch member B' is engaged by bearing balls G' also engaging a bearing member G which is held against rotation, but free to move lengthwise (axially) to a limited extent, for instance by making said bearing member with pins G'' extending outwardly through longitudinal slots H' in a cap H fitted on the end of the casing A. The two clutch members B', E' are normally held together, in driving engagement, by a spring device which may consist of two springs I, I' interposed between the bearing member G and a backing or abutment J. One of the springs, I, engages the bearing member G and the abutment J permanently, the other spring, I', is shorter and therefore does not become active until after the abutment J has moved a certain distance toward the bearing member G, thus obtaining a graduated spring action, said abutment J being adjustable, in the embodiment illustrated, to vary the tension of the spring device. For this purpose, said abutment is formed as a nut adapted to be screwed on a stationary externally-threaded sleeve K in which the shaft B is journaled, said sleeve K being rigidly secured to the casing A, while the adjustable nut J may be turned by means of a nail or suitable tool inserted into holes J' accessible through an opening A' in the casing A.

The lower or outer end of the driven shaft E carries the tool to be operated, a screwdriver L being illustrated. The connection may be made in any suitable manner, for instance by means of a chuck M of any usual or approved construction. In conjunction with the screw driver L or other tool, I have provided a centering device which greatly facilitates placing the tool quickly in proper position for efficient work. In the construction illustrated by Figs. 1 and 2, this device consists of a sleeve N fitted loosely on the shank L' of the tool L, so that such sleeve may slide lengthwise on said shank but will rotate with the tool. The sleeve N is held on the tool shank by pins N' having a limited movement in longitudinal slots L" on the shank of the tool. The parts are so proportioned that when the pins are at the bottom of the slots, the lower end of the sleeve N will project beyond the edge of the screw driver L. This lower end is made with a flaring inner surface N" adapted to engage the head of the screw to be driven home, and it will be understood that owing to this formation, the sleeve N will engage properly screw heads of different diameters, within a relatively wide range, and properly center the tool L relatively to such heads.

It will be understood that normally the clutch members B', E', under the influence of the spring device I, I', will couple the shafts B, E for rotation in unison, so that the tool L will be rotated. The sleeve N, the interior diameter of which corresponds closely to the width of the edge of the screw driver L, will rotate with the tool, and the projecting lower end of said sleeve will be slipped over the head of the screw to be driven home, so as to center the tool. By then pressing the tool downwardly, the workman will bring the edge of the screw driver into operative relation to the head of the screw, and the latter will be turned to drive it into the material. The pressure forcing the tool N against the screw is supplied by the spring I or the springs I, I' (depending on the adjustment of the abutment L), and is therefore independent of the pressure exerted by the workman. Uniform results are thus insured. When the screw has been driven home, it will oppose a greatly increased resistance to the rotation of the tool, and the latter will stop. The upper clutch member B' will then automatically move away from the lower clutch member E', against the tension of the springs I, I', the shape of the companion formations B", E", enabling such disengagement to take place readily. By adjusting the abutment J axially, I can regulate the action of the springs I, I' and therefore the degree or tightness with which the screws will be driven home before the clutch B', E' will become disengaged.

The sleeve N also forms an efficient guard to prevent injury to the workman, and a knurled collar O mounted loosely to turn thereon, but held against longitudinal movement by pins O', constitutes a convenient handle by which the workman may guide the tool into proper operative relation to the screw.

At P I have indicated washers of felt or other suitable material which serve to prevent the escape of the oil used for lubrication.

In Fig. 6 I have shown a modification in which the sleeve n not only has a longitudinal movement on the shank L' of the tool, but may rotate thereon, the connection being made, for instance, by a pin n' extending into an annular groove $L^2$ on said shank L'. This sleeve n does not have a flaring portion such as N", but is cylindrical inside to its bottom. Thus when the centering sleeve n is lowered into contact with the screw and with the wood, metal, or other material into which the screw has been inserted, the rotation of the sleeve will stop automatically, which is an advantage in the case of materials, such as bakelite, which might be marred by the rotating sleeve. Another advantage of this modification is that the non-rotary sleeve n will form a convenient auxiliary handle, dispensing with a separate part such as the knurled collar O.

While I have illustrated the invention as applied to a screw-driver, it will be evident that other tools may be operated in the same manner, for instance bottom-taps, socket-wrenches, etc. It will also be understood that the sleeve N or n will fit the respective tool L, and whenever a screw driver of a different size is substituted, a corresponding centering sleeve will be substituted at the same time.

Various modifications may be made without departing from the nature of my invention as set forth in the appended claims.

The sleeve N of Figs. 1, 2, and 7 is shown as having a diametral slot $N^2$ extending from its lower end to the upper end of the thickened portion of the sleeve, the edge or blade of the screw driver being guided in said slot as shown in Figs. 1 and 7.

It will be understood that when the clutch member B' is rigid with the shaft B, the latter will have a feather-and-groove or equivalent sliding connection with the flexible shaft D or other drive.

I claim:

1. In mechanism for driving a rotary tool, a driving shaft, a driven tool shaft aligning therewith, a clutch connection between said shafts, comprising companion members held to rotate with the respective shafts, the clutch member on the driving shaft being movable axially toward and from the other clutch member, a spring device for normally keeping said clutch members in operative engagement, said members being constructed to release the tool shaft when the resistance to its rotation attains a predetermined limit, a stationary externally threaded sleeve through which said driving shaft extends, and an abutment screwing on said sleeve and engaging said spring device to adjust the tension thereof.

2. In mechanism for driving a rotary tool, a driving shaft, a driven tool shaft aligning therewith, a clutch connection between said shafts, comprising companion members held to rotate with the respective shafts, the clutch member on the driving shaft being movable axially toward and from the other clutch member, a bearing member for said axially movable clutch member, said bearing member being held against rotation but capable of axial movement, a spring device engaging said bearing member and normally keeping said clutch members in operative engagement, said clutch members being constructed to release the tool shaft when the resistance to its rotation attains a predetermined limit, a stationary externally threaded sleeve through which said driving shaft extends, and an abutment screwing on said sleeve and engaging said spring device to adjust the tension thereof.

In testimony whereof I have hereunto set my hand.

RAYMOND L. HERMAN.